(12) United States Patent
Zangi et al.

(10) Patent No.: US 6,778,619 B2
(45) Date of Patent: Aug. 17, 2004

(54) METHODS FOR RECEIVING DIVERSITY TRANSMISSIONS INCLUDING PREFILTERING TO PROVIDE MINIMUM PHASE CHANNEL CHARACTERISTICS AND RELATED RECEIVERS

(75) Inventors: Kambiz C. Zangi, Durham, NC (US); Dennis Hui, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 470 days.

(21) Appl. No.: 09/853,207

(22) Filed: May 11, 2001

(65) Prior Publication Data

US 2002/0176492 A1 Nov. 28, 2002

(51) Int. Cl.[7] .............................. H04L 1/02; H03K 5/159
(52) U.S. Cl. ........................ 375/347; 375/232; 455/132
(58) Field of Search ................................ 375/267, 347, 375/229, 232, 340, 350, 346; 455/132, 137, 138, 139

(56) References Cited

U.S. PATENT DOCUMENTS

| | | | |
|---|---|---|---|
| 5,905,743 A | 5/1999 | Ramesh | 371/43.7 |
| 6,088,408 A * | 7/2000 | Calderbank et al. | 375/347 |
| 6,314,147 B1 * | 11/2001 | Liang et al. | 375/346 |
| 6,430,231 B1 * | 8/2002 | Calderbank et al. | 375/295 |
| 6,590,932 B1 * | 7/2003 | Hui et al. | 375/232 |

FOREIGN PATENT DOCUMENTS

WO   WO 01/39448   5/2001

OTHER PUBLICATIONS

Lindskog & Paulraj; *A Transmit Diversity Scheme for Channels with Intersymbol Interference*; Department of Electrical Engineering, ISL (2000 IEEE).

Forney, Jr.; *Maximum–Likelihood Sequence Estimation of Digital Sequences in the Presence of Intersymbol Interference*; IEEE Transactions on Information Theory, vol. IT–18, No. 3, May 1972; pp 363–378.

John Proakis; Elements of a Digital Communications System and Information Theory; Digital Communications Second Edition (1989) pp 136–139.

Gottfried Ungerboeck; *Adaptive Maximum–Likelihood Receiver for Carrier–Modulated Data–Transmission Systems*; IEEE Transactions on Communications, vol. COM–22, No. 5, May 1974; pp 624–636.

Torsten Söderström; *Convergence Properties of the Generalized Least Squares Identification Method*; pp 617–626.

Lennart Ljung; *System Identification: Theory for the User*; Prentice–Hall, Inc. pp 288–300.

(List continued on next page.)

*Primary Examiner*—Tesfaldet Bocure
(74) *Attorney, Agent, or Firm*—Myers Bigel Sibley & Sajovec

(57) ABSTRACT

A method for receiving transmissions includes receiving a first symbol-spaced baseband signal corresponding to first portions of first and second encoded data sequences transmitted over first and second baseband channels, and receiving a second symbol-spaced baseband signal corresponding to second portions of the first and second encoded data sequences transmitted over the first and second baseband channels. The first and second symbol-spaced baseband signals are combined to provide a combined baseband signal, and the combined baseband signal is prefiltered to provide minimum phase channel characteristics. The prefiltered combined baseband signal is equalized to provide an estimate of a data sequence. Related receivers are also discussed.

39 Claims, 5 Drawing Sheets

OTHER PUBLICATIONS

Jingdong Lin et al; *Optimal Tracking of Time–Varying Channels: A Frequency Domain Approach for Known and New Algorithms*; IEEE Transactions on Selected Areas in Communications; vol. 13, No. 1, Jan. 1995; pp 141–154.

Bauch; "MAP Equalization of Space–Time Coded Signals over Frequency Selective Channels"; Wireless communications and networking conference 1999. WCNC 1999 IEEE (Sep. 21, 1999); pp261–265. XP–010353817.

Lindskog et al; "A Transmit Diversity Scheme for Channels with Intersymbol Interference"; 2000 IEEE International Conference on Communications, ICC 2000 (Jun. 18–22, 2000) pp 307–311 vol. 1 XP–002188886.

Alamouti; "A Simple Transmit Diversity Technique for Wireless Communications"; IEEE Journal on Selected Areas in Communications, IEEE Inc., NY vol. 16, No. 8 (Oct. 10, 1998) pp; 1451–1458. XP–002100058.

PCT Search Report for PCT/US 02/14800.

European Patent Office, Standard Search Report, EPO File No. RS 106788 US corresponding to U.S. application Ser. No. 853,207, Examiner D. Reilly, Jan. 31, 2002.

Erik Lindskog and Dino Flore; Time–Reversal Space–Time Block Coding and Transmit Delay Diversity–Separate and Combined; IEEE pp 572–577/.

PCT Written Opinion for PCT/US02/14800.

* cited by examiner

METHODS FOR RECEIVING DIVERSITY TRANSMISSIONS INCLUDING PREFILTERING TO PROVIDE MINIMUM PHASE CHANNEL CHARACTERISTICS AND RELATED RECEIVERS

BACKGROUND OF THE INVENTION

The present invention relates to the field of communications and more particularly to methods and receivers for receiving signals transmitted with transmit diversity.

A two branch transmit diversity scheme for channels without intersymbol interference is discussed by S. M. Alamouti in the reference entitled "A Simple Transmit Diversity Technique For Wireless Communications," *Journal Of Selective Communications*, vol. 16, no. 8, pp. 1451–1458. With two transmit antennas and one receive antenna, second order diversity may be provided.

A method which handles a corresponding case when a channel suffers from intersymbol interference is discussed by Erik Lindskog et al. in the reference entitled "A Transmit Diversity Scheme For Channels With Intersymbol Interference," IEEE, International Communication Conference, ICC 2000. As discussed by Lindskog et al., with two transmit antennas and one receive antenna, the same diversity can be achieved as with one transmit and two receive antennas. The disclosures of both the Alamouti and Lindskog et al. references are hereby incorporated herein in their entirety by reference.

SUMMARY OF THE INVENTION

According to embodiments of the present invention, methods for receiving transmissions from a diversity transmitter include receiving a first symbol-spaced baseband signal corresponding to first portions of first and second encoded data sequences transmitted over first and second baseband channels, and receiving a second symbol-spaced baseband signal corresponding to second portions of the first and second encoded data sequences transmitted over the first and second baseband channels. The first and second symbol-spaced baseband signals are combined to provide a combined baseband signal, and the combined baseband signal is prefiltered to provide minimum phase channel characteristics. The prefiltered combined baseband signal is equalized to provide an estimate of a data sequence.

By prefiltering the combined baseband signal, the data sequence can be estimated using a reduced complexity equalizer such as a decision feedback estimate equalizer or a reduced state sequence estimate equalizer. Accordingly, overall receiver complexity may be reduced while maintaining receiver performance.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by those of skill in the art, the present invention may be embodied as methods or devices. Accordingly, the present invention may take the form of a hardware embodiment, a software embodiment or an embodiment combining software and hardware aspects.

Figure 6:
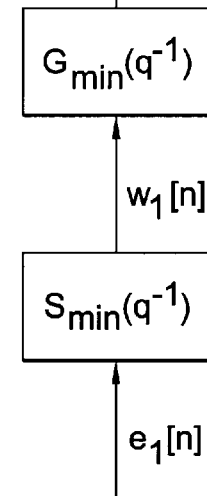
FIG. 6 illustrates an equivalent block diagram for receivers and methods with one receive antenna and two transmit antennas.
Figure 6:
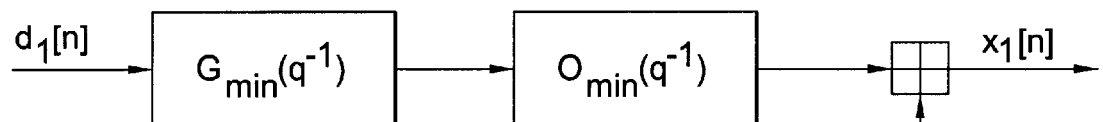
Figure 7:
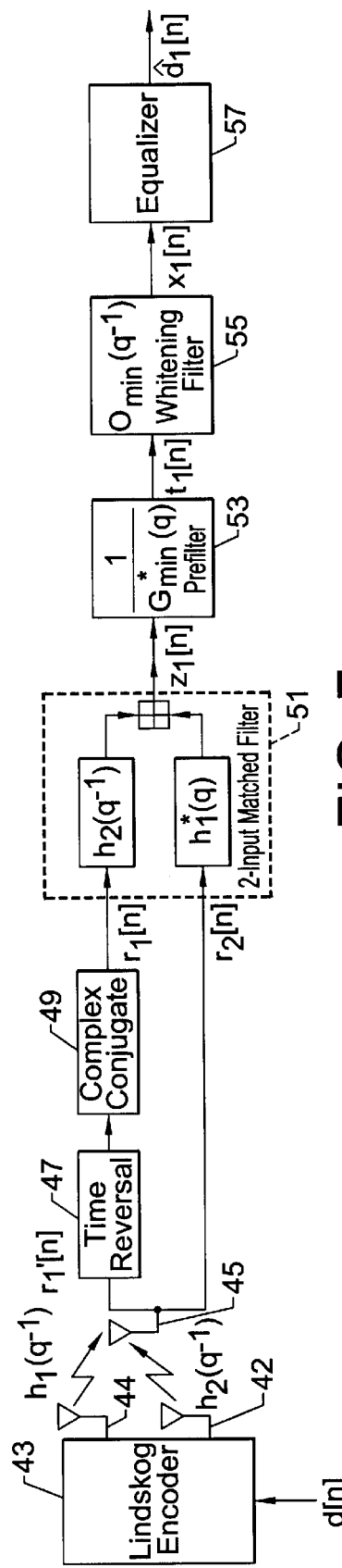
FIG. 7 illustrates receiver chains of methods and receivers according to the present invention.

Embodiments of receivers and methods according to the present invention are illustrated by the receiver of FIG. 7. As shown, the receiver of FIG. 7 is configured to receive transmission bursts from transmit antennas 42 and 44 of the Lindskog encoder 43. During a transmission burst, transmissions from the transmit antennas 42 and 44 are received at the receiver antenna 45 over the baseband channels $h_1(q^{-1})$ and $h_2(q^{-1})$. The received signal includes $r_1'[n]$ and $r_2[n]$ components with the $r_2[n]$ component being provided directly to the 2-input matched filter 51. The $r_1'[n]$ component is processed through time reversal and complex conjugate blocks 47 and 49 to generate $r_1[n]$ which is provided to the 2-input matched filter 51. The 2-input matched filter output $z_1[n]$ is processed through the prefilter 53, the whitening filter 55, and the reduced complexity equalizer 57 to provide an estimate $\hat{d}[n]$ of the input $d[n]$. Operations of the elements of FIG. 7 and derivations thereof are discussed below with respect to FIGS. 1–6.

According to embodiments of the present invention, receivers and methods can be provided for receiving signals transmitted according to the transmit diversity scheme discussed by by Erik Lindskog et al. in the reference entitled "A Transmit Diversity Scheme For Channels With Intersymbol Interference" (ICC 2000). More particularly, prefiltering can be used in receivers and methods according to the present invention to provide a composite baseband channel that is compatible with reduced complexity sequence estimation equalizers 57 such as, for example, decision feedback sequence estimation (DFSE) equalizers or reduced state sequence estimation (RSSE) equalizers. Such a prefilter, for example, can be designed for use following a 2-input/1-output matched filter 51 used for demodulation of a transmit diversity signal. Receiver complexity can, thus, be reduced using prefilters according to the present invention.

Figure 1:
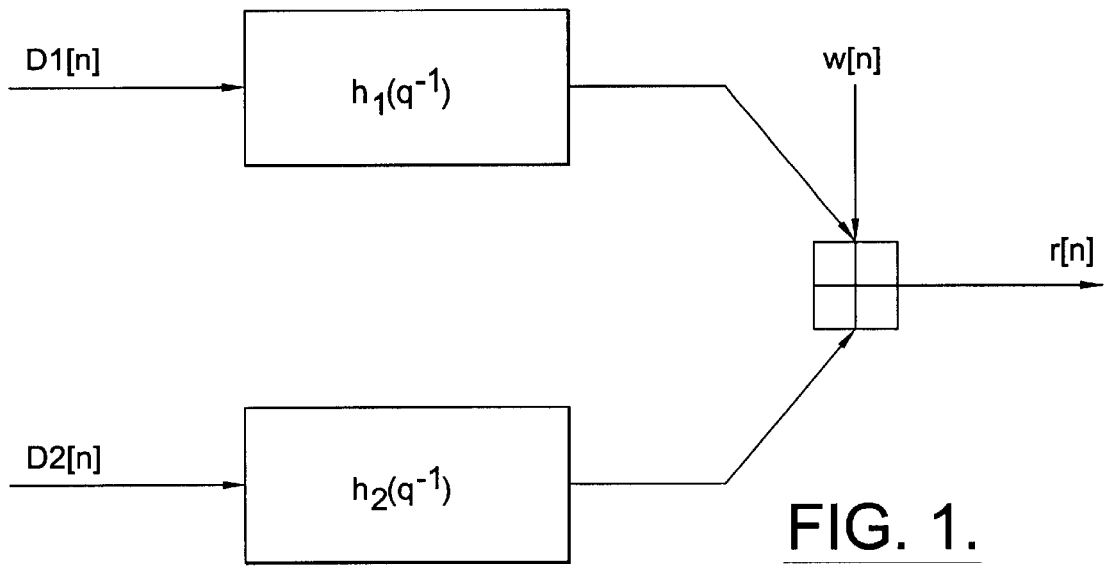
FIG. 1 illusrates a baseband model for systems and methods with two transmit antennas and one receive antenna.

As shown in FIG. 1, r[n] is a received symbol-spaced baseband signal; D1[n] are transmitted digital symbols from a first antenna; D2[n] are transmitted digital symbols from a second antenna; $h_1(q^{-1})$ is a baseband channel between the first antenna and the receiver; $h_2(q^{-1})$ is a baseband channel between the second transmit antenna and the receiver; and w[n] is a Gaussian noise with variance $\sigma_w^2$ and autocorrelation $p_{ww}[k]$. The noise w[n] can be modeled as an output of a minumum-phase filter $s_{min}(q^{-1})$ driven by a unit-variance white noise sequence e[n] (i.e. $w[n]=s_{min}(q^{-1})e[n]$). While the channels are generally assumed to be fading, the channels are assumed to be constant over the transmission of one block of symbols (i.e. one burst).

When transmitting a block of 2N digital symbols $\{d[n]\}_{n=0}^{2N-1}$, the 2N symbols are first divided into two blocks: $d_1[n]$ and $d_2[n]$ of N symbols each such that:

$$d_1[n]=d[n] \; n=0, \ldots, N-1; \text{ and} \quad \text{equation (1)}$$

$$d_2[n]=d[N+n] \; n=0, \ldots, N-1. \quad \text{equation (2)}$$

The two symbol blocks $d_1[n]$ and $d_2[n]$, for example, may represent two half-bursts of a normal GSM (Global System for Mobile Communication) burst. Two new sequences $\check{d}_1[n]$ and $\check{d}_2[n]$ can then be constructed as follows:

$$\check{d}_1[n]=(d_1[N-1-n])^* \; n=0, \ldots, N-1; \text{ and} \quad \text{equation (3)}$$

$$\check{d}_2[n]=(d_2[N-1-n])^* \; n=0, \ldots, N-1. \quad \text{equation (4)}$$

Figure 2:
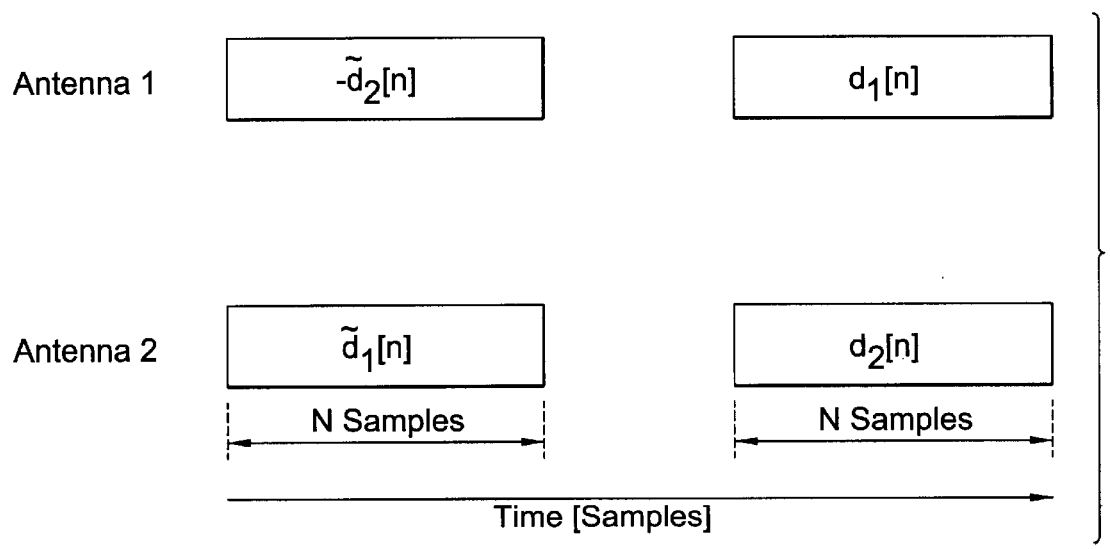
FIG. 2 illustrates constructions of bursts transmitted on two antennas using transmit diversity.

FIG. 2 illustrates the symbols transmitted from the two antennas over an interval of 2N symbol periods (over one burst). The signal received at the receiver antenna 45 corresponding to the transmission of the first half burst (i.e. corresponding to the simultaneous transmission of $-\check{d}_2[n]$ and $\check{d}_1[n]$) will be denoted by $r_1'[n]$ such that:

$$r_1'[n]=-h_1(q^{-1})\check{d}_2[n]+h_2(q^{-1})\check{d}_1[n]+w_1'[n]. \quad \text{equation (5)}$$

The signal received at the receiver antenna 45 corresponding to the transmission of the second half burst (i.e. corresponding to the simultaneous transmission of $d_1[n]$ and $d_2[n]$) will be denoted by $r_2[n]$ such that:

$$r_2[n]=h_1(q^{-1})d_1[n]+h_2(q^{-1})d_2[n]+w_2[n]. \quad \text{equation (6)}$$

As discussed in greater detail below, there may be a silent interval of an appropriate duration between the transmission of the first N symbols and the second N symbols of the transmission burst including 2N symbols. Symbol transmission is discussed in greater detail in the reference by Erik Lindskog et al. entitled "A Transmit Diversity Scheme For Channels With Intersymbol Interference", the disclosure of which is hereby incorporated herein in its entirety by reference.

According to embodiments of the present invention, $r_1'[n]$ and $r_2[n]$ can be processed at the receiver so that diversity equivalent to that of a system with one transmit antenna and two receive antennas can be achieved. At the receiver, the signal $r_1'[n]$ corresponding to the transmission of the first half burst can be time reversed and conjugated to provide:

$$r_1[n]=(r_1'[N-1-n])^*, \; n=0, \ldots, N-1 \quad \text{equation (7)}$$

$$r_1[n]=-h_1^*(q)d_2[n]+h_2^*(q)d_1[n]+w_1[n], \; n=0, \ldots, N-1 \quad \text{equation (8)}$$

where $w_1[n]=(w_1'[N-1-n])^*$. Equations (6) and (8) can be combined into a single matrix equation as follows:

$$\begin{bmatrix} r_1[n] \\ r_2[n] \end{bmatrix} = \underbrace{\begin{bmatrix} h_2^*(q) & -h_1^*(q) \\ h_1(q^{-1}) & h_2(q^{-1}) \end{bmatrix}}_{H(q,q^{-1})} \begin{bmatrix} d_1[n] \\ d_2[n] \end{bmatrix} + \begin{bmatrix} w_1[n] \\ w_2[n] \end{bmatrix} \quad \text{equation (9)}$$

Equation (9) can be used to demonstrate properties of transmission diversity according to the Erik Lindskog et al. reference. The channel matrix $H(q,q^{-1})$ is orthogonal such that:

$$H^H(q,q^{-1})H(q,q^{-1}) = \begin{bmatrix} h_2(q^{-1}) & h_1^*(q) \\ -h_1(q^{-1}) & h_2^*(q) \end{bmatrix} \begin{bmatrix} h_2^*(q) & -h_1^*(q) \\ h_1(q^{-1}) & h_2(q^{-1}) \end{bmatrix} \quad \text{equation (10)}$$

$$= [h_1^*(q)h_1(q^{-1}) + h_2^*(q)h_2(q^{-1})]I, \quad \text{equation (11)}$$

where I is the 2×2 identity matrix. The sequences $r_1[n]$ and $r_2[n]$ can be processed at a two input matched filter to provide:

$$\begin{bmatrix} z_1[n] \\ z_2[n] \end{bmatrix} = H^H(q,q^{-1}) \begin{bmatrix} r_1[n] \\ r_2[n] \end{bmatrix} \quad \text{equation (12)}$$

$$= \begin{bmatrix} (h_1^*(q)h_1(q^{-1}) + h_2^*(q)h_2(q^{-1}))d_1[n] + v_1[n] \\ (h_1^*(q)h_1(q^{-1}) + h_2^*(q)h_2(q^{-1}))d_2[n] + v_2[n] \end{bmatrix}, \quad \text{equation (13)}$$

where $v_1[n]$ and $v_2[n]$ are defined by:

$$\begin{bmatrix} v_1[n] \\ v_2[n] \end{bmatrix} = H^H(q,q^{-1}) \begin{bmatrix} w_1[n] \\ w_2[n] \end{bmatrix} \quad \text{equation (14)}$$

Assuming that $w_1[n]$ and $w_2[n]$ are independent from each other (i.e. $E(w_1[n]w_2^*[n+m])=0$ for all m and n), the power spectrum of the 2×1 vector $\underline{v}[n]=[v_1[n]v_2[n]]^T$ can be derived. The assumption of independence between $w_1[n]$ and $w_2[n]$ can be justified if the duration of the silent period, k, is such that $p_{ww}(l)=0$ for all $l>k$. With this assumption:

$$R_{vv}(q,q^{-1}) = \sum_{m=-\infty}^{\infty} E(\underline{v}(n)\underline{v}^H(n-m))q^{-m} \quad \text{equation (15)}$$

$$= H^H(q,q^{-1})R_{ww}(q,q^{-1})H(q,q^{-1}), \quad \text{equation (16)}$$

where $R_{ww}(q,q^{-1})$ is the power spectrum of the 2×1 vector $\underline{w}[n]=[w_1[n]w_2[n]]^T$. Because $w_1[n]$ and $w_2[n]$ are independent and both have the same statistics, $$R_{ww}(q,q^{-1})=s_{min}^*(q) \; s_{min}(q^{-1})I \quad \text{equation (17)}$$

where I is a 2×2 identity matrix. Substituting equation (17) into equation (16), the equation:

$$R_{vv}(q,q^{-1})=[h_1^*(q)h_1(q^{-1})+h_2^*(q)h_2(q^{-1})]s_{min}^*(q)s_{min}(q^{-1})I \quad \text{equation (18)}$$

is provided where $G(q,q^{-1})$ can be defined as $[h_1^*(q)h_1(q^{-1})+h_2^*(q)h_2(q^{-1})]$. From equation (18) it can be seen that the power spectrum of $v_1[n]$ is:

$$R_{v_1v_1}(q,q^{-1})=G(q,q^{-1})s_{min}^*(q)s_{min}(q^{-1}) \quad \text{equation (19)}$$

The power spectrum of $v_2[n]$ can be the same as the power spectrum of $v_1[n]$, and $v_1[n]$ and $v_2[n]$ are independent.

Figure 3:
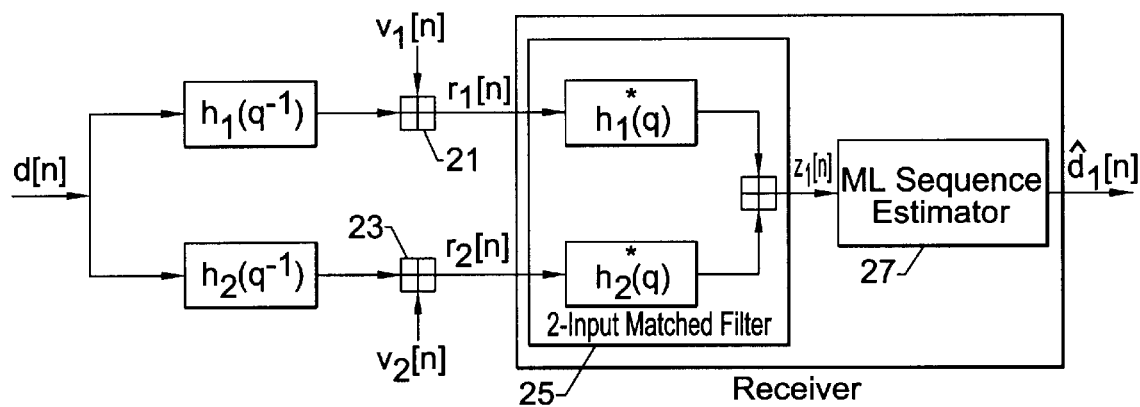
FIG. 3 illustrates a model for systems and methods with one transmit antenna and two receive antennas.

From equation (13), it can be shown that $d_1[n]$ can be detected solely from $z_1[n]$, and that $d_2[n]$ can be detected solely from $z_2[n]$ because $v_1[n]$ and $v_2[n]$ are independent. In other words, the detection of $d_1[n]$ and $d_2[n]$ can be decoupled by multiplying $[r_1[n]r_2[n]]^T$ by $H^H(q,q^{-1})$. In addition, the expression for $z_1[n]$ is the same as the expression that can be obtained in a system with one transmit antenna and two receive antennas followed by a 2-input matched filter as illustrated in FIG. 3.

A full MLSE equalizer for estimating $d_1[n]$ based on $z_1[n]$ in a transmit diversity system with one receive antenna as discussed by Erik Lindskog in the reference entitled "A Transmit Diversity Scheme For Channels With Intersymbol Interference", however, may be undesirably complex. Assuming a 5-tap model for $h_1(n)$ and $h_2(n)$, the baseband channel $g[n]$ may have 9 taps. A full MLSE equalizer for a 9-tap $g[n]$ and 8PSK symbols may require 4096 states (using an Ungerboeck trellis). Accordingly, receivers having reduced complexity are desired for use with transmit diversity systems discussed in the reference entitled "A Transmit Diversity Scheme For Channels With Intersymbol Interference" by Erik Lindskog et al.

According to embodiments of the present invention, reduced complexity methods and receivers may be provided for receiving diversity transmissions at a single antenna. More particularly, reduced complexity equalization, such as DFSE or RSSE equalization, can be used to reduce complexity of the receiver without significantly reducing performance. DFSE equalizers, however, may not provide sufficient performance with baseband channels that do not have most of their energy concentrated in the first few taps (i.e. a minimum phase channel), and the original baseband channel $g[n]$ may not have minimum phase channel characteristics as are desirable for use with a DFSE equalizer.

Receivers and methods according to embodiments of the present invention, thus, include prefiltering $f[n]$ such that ($g[n]* f[n]$) has most of its energy in the first few taps to provide minimum phase channel characteristics. In addition, the noise at the output of the prefilter should have the same color as the original baseband noise (i.e. the same color as $w_1(n)$). Stated in other words, receivers and methods according to embodiments of the present invention may further provide that the combination of matched filtering and prefiltering does not significantly change the color of the original baseband noise. Prefiltering according to embodiments of the present invention is discussed in greater detail below.

For purposes of illustration, the following discussion will focus on estimating $d_1[n]$ from $z_1[n]$. It will be understood that the same techniques can be used to estimate $d_2[n]$ from $z_2[n]$.

In particular, a spectral factorization for the baseband channel relating $d_1[n]$ to $z_1[n]$ can be provided recalling that the composite baseband channel $G(q,q^{-1})$ can be given by:

$$G(q,q^{-1})=[h_1^*(q)h_1(q^{-1})+h_2^*(q)h_2(q^{-1})].$$  equation (20)

Using the spectral factorization of $G(q,q^{-1})$, a causal minimum-phase linear filter $G_{min}(q^{-1})$ can be computed such that:

$$G(q,q^{-1})=G_{min}(q^{-1})G_{min}^*(q),$$  equation (21)

where $G_{min}(q^{-1})$ is minimum phase. The factorization in equation (21) is always possible because $G(q,q^{-1})$ is a proper power spectrum. Substituting equation (21) into equation (18) the following expression for $R_{vv}(q,q^{-1})$ is provided:

$$R_{vv}(q,q^{-1})=[G_{min}^*(q)s_{min}^*(q)][G_{min}(q^{-1})s_{min}(q^{-1})]^T.$$  equation (22)

Figure 4:
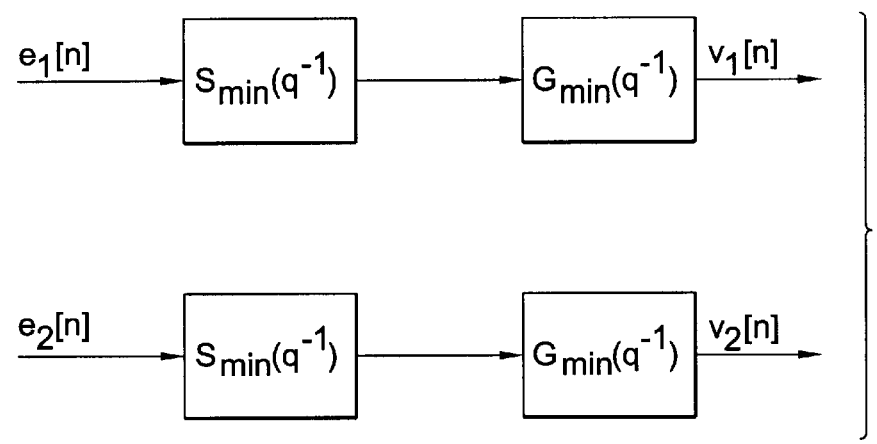
FIG. 4 illustrates a model for noise in systems and methods with two transmit antennas and one receive antenna.
Figure 5:
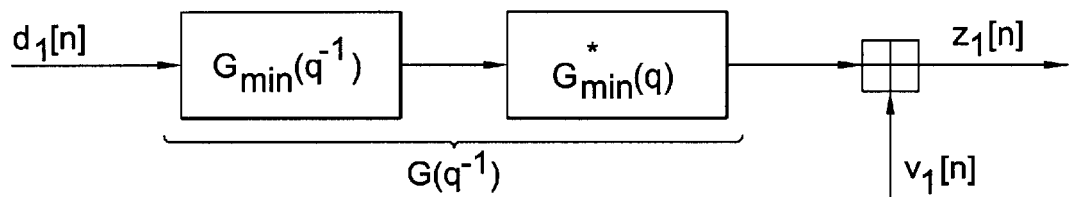
FIG. 5 illustrates an equivalent block diagram for receivers and methods with one receive antennas and two transmit antennas.

Using equation (22), $v_1[n]$ and $v_2[n]$ can be modeled as outputs of two identical Linear Time Invariant (LTI) systems, with each being driven by a mutually independent white noise sequence $e_1[n]$ and $e_2[n]$ respectively as shown in FIG. 4. Using the model for noise $v_1[n]$ illustrated in FIG. 4, a block diagram for the first row of equation (13) is provided in FIG. 5 where $e_1[n]$ is a white noise sequence and $v_1[n]$ is a colored noise sequence.

A whitening equalizer can be used to obtain a maximum likelihood sequence estimate of $d_1(n)$ based on observations of $z_1[n]$. To this end, $z_1[n]$ can first be filtered using a prefilter $f(q)=1/[G_{min}^*(q)]$ to obtain $t_1[n]$ such that $t_1[n]=z_1[n]/[G_{min}^*(q)]$. The prefilter $f(q)$ can: (1) provide that the composite baseband channel has minimum-phase channel characteristics; and (2) reduce the coloration of $v_1[n]$ resulting from $G_{min}(q^{-1})$. Referring to the Figures, the noise component in $z_1[n]$ can be colored by $G_{min}(q^{-1})$ and $S_{min}(q^{-1})$. In other words, coloration due to $G_{min}(q^{-1})$ can be reduced by applying the prefilter $1/[G_{min}^*(q)]$ to $z_1[n]$. Prefilters are also discussed in U.S. patent application Ser. No. 09/378,314 filed Aug. 20, 1999, entitled "Method And Apparatus For Computing Prefilter Coefficients For Digital Equalizers" to Kambiz Zangi and Dennis Hui, the inventors of the present invention. The disclosure of U.S. patent application Ser. No. 09/378,314 is hereby incorporated herein in its entirety by reference.

After prefiltering by $f(q)$, the noise component remaining in $t_1[n]$ primarily results from $s_{min}(q^{-1})$ so that a noise whitening filter $O_{min}(q^{-1})$ matched to $s_{min}(q^{-1})$ can be used to reduce this coloration. The noise whitening filter $O_{min}(q^{-1})$ can be a minimum phase linear filter which can whiten the original noise sequence $w(n)$. In other words, the power spectrum of $[w(n)][O_{min}(q^{-1})]$ can have approximately a flat magnitude. Referring to FIG. 7, the output of this whitening filter can be indicated by $x_1[n]$ i.e.

$$x_1[n]=O_{min}(q^{-1})t_1[n].$$  equation (23)

The output $x_1[n]$ can then be passed to a Euclidean metric DFSE equalizer to provide $\hat{d}_1[n]$. Noise whitening filters are also discussed in U.S. patent application Ser. No. 09/450,684 filed Nov. 24, 1999, entitled "Methods, Receiver Devices, and Systems For Whitening A Signal Disturbance In A Communications Signal" to Dennis Hui, Kambiz Zangi, and Rajarem Ramesh, wherein Dennis Hui and Kambiz Zangi are inventors of the present invention, and in corresponding PCT Application No. PCT/US00/26776. The disclosure of U.S. patent application Ser. No. 09/450,684 (and corresponding PCT Application No. PCT/US00/26776) is hereby incorporated herein in its entirety by reference. The order of performing the prefiltering and whitening operations can be reversed.

The prefilter $f(q)$ can be computed by applying spectral factorization algorithms to $G(q,q^{-1})$. The resulting prefilter $f(g)$ may have an anti-causal linear filter response. In addition, the noise whitening filter $Omin(q^{-1})$ can be computed using existing noise whitening techniques as discussed, for example, in U.S. patent application Ser. No. 09/450,684 (discussed above); U.S. Pat. No. 5,905,743 to Rajaram Ramesh entitled "Apparatus, Methods And Computer Program Products For Sequential Maximum Likelihood Estimating Communications Signals Using Whitening Path Metrics"; G. David Forney, Jr., "Maximum-Likelihood Sequence Estimation Of Digital Sequences In The Presence Of Intersymbol Interference", IEEE TRANS. INFOR. THEORY, vol. IT-18, No. 3, May 1972; and U.S. Pat. No. 5,031,195 to Pierre R. Chevillat et al. entitled "Fully Adaptive Modem Receiver Using Whitening Matched Filtering".

The disclosures of each of these references are hereby incorporated herein in their entirety by reference. The effective baseband channel after prefiltering and noise whitening (i.e. the channel with input $d_1(n)$ and output $x_2[n]$ can thus have most of its energy in the first few taps so that the input to the DFSE equalizer is approximately minimum phase, and so that the noise at this output is almost white.

FIG. 6 illustrates a block diagram relating $d_1[n]$ to $x_1[n]$ where $e_1[n]$ is an approximately white sequence. FIG. 7 illustrates a block diagram of receiver chains for detecting $d_1[n]$. A similar chain may be implemented to detect $d_2[n]$. As shown in FIG. 7, receiver chains according to embodiments of methods and receivers of the present invention for receiving diversity transmissions from a Lindskog encoder 43 are illustrated. Operations of the Lindskoq encoder are discussed by Erik Lindskog et al. in the reference entitled "A Transmit Diversity Scheme For Channels With Intersymbol Interference" (previously cited).

According to embodiments of methods and receivers of the present invention, the receiver chain can include antenna 45, time reversal block 47, complex conjugate block 49, 2-input matched filter 51, prefilter 53, whitening filter 55, and DFSE equalizer 57. The Lindskog encoder 43 receives a symbol sequence d[n] of length 2N and transmits corresponding symbols $\tilde{d}1[n]$ and $\tilde{d}2[n]$ as defined in equations (1), (2), (3), (4) and FIG. 2 from antennas 42 and 44 over channels $h_1(q^{-1})$ and $h_2(q^{-1})$ to receiver antenna 45. The signal received at the antenna includes $r_1'[n]$ as defined in equation (5) and $r_2[n]$ as defined in equation (6). The signal $r_1'[n]$ is processed through time reversal and complex conjugate blocks 47 and 49 to provide $r_1[n]$ as defined in equations (7) and (8) while $r_2[n]$ is provided directly to the 2-input matched filter 51.

The 2-input matched filter 51 generates the output $z_1[n]$ as discussed above such that:

$$z_1(n) = [r_1(n)][h_2(q^{-1})] + [r_2(n)][h_1{}^*(q)]. \quad \text{equation (24)}$$

A second receiver chain can similarly generate output $z_2[n]$ such that:

$$z_2(n) = [r_1(n)][-h_1(q^{-1})] + [r_2(n)][h_2{}^*(q)]. \quad \text{equation (25)}$$

The output $z_1[n]$ is filtered by prefilter f(q) 53 using $f(q) = 1/[G_{min}{}^*(q)]$ to obtain prefilter output $t_1[n]$. The prefilter output $t_1[n]$ is then provided to noise whitening filter 55 to provide $x_1[n]$ for input to the reduced complexity equalizer 57 such as a Euclidean Metric DFSE equalizer. A DFSE equalizer can thus generate an estimate $\hat{d}_1[n]$ of the first half of the symbol stream $d_1[n]$ input to the Lindskog encoder. A second parallel receiver chain can be implemented to generate an estimate $\hat{d}_2[n]$ of the second half of the symbol stream $d_2[n]$ input to the Lindskog encoder using $z_2[n]$ as defined in equation (25).

As will be appreciated by those of skill in the art, the above-described aspects of the present invention may be provided by hardware, software, or a combination of the above. For example, while various elements of receiver devices and methods have been illustrated in FIG. 7, in part, as discrete elements, they may, in practice be implemented by a digital signal processor including input and output ports and running software code, by custom or hybrid chips, by discrete components or by a combination of the above.

Operations of the present invention will now be described with respect to the flowcharts of FIGS. 8 and 9. It will be understood that each block of the flowchart illustrations and the block diagram illustration of FIG. 7, and combinations of blocks in the flowchart illustrations and the block diagram of FIG. 7, can be implemented by computer program instructions. These program instructions may be provided to a processor to produce a machine, such that the instructions which execute on the processor create means for implementing the functions specified in the flowchart and block diagram block or blocks. The computer program instructions may be executed by a processor to cause a series of operational steps to be performed by the processor to produce a computer implemented process such that the instructions which execute on the processor provide steps for implementing the functions specified in the flow chart and block diagram block or blocks.

Accordingly, blocks of the flowchart illustrations and the block diagrams support combinations of means for performing the specified functions, combinations of steps for performing the specified functions and program instruction means for performing the specified functions. It will also be understood that each block of the flowchart illustrations and block diagrams, and combinations of blocks in the flowchart illustrations and block diagrams, can be implemented by special purpose hardware-based systems which perform the specified functions or steps, or combinations of special purpose hardware and computer instructions.

Figure 8:
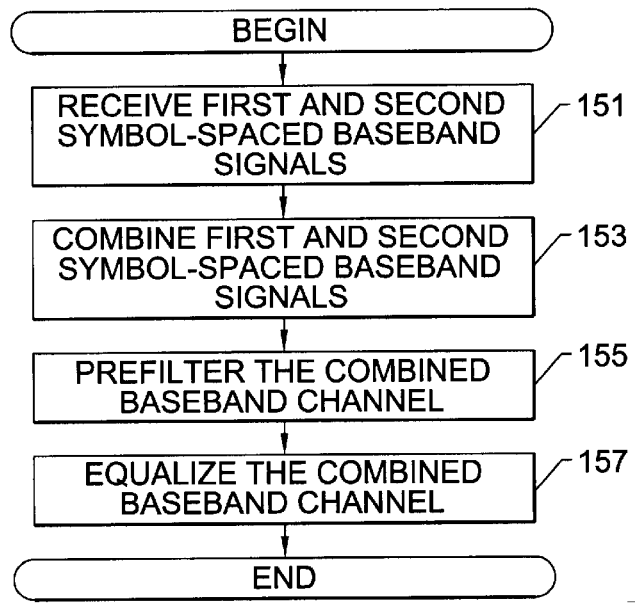
FIGS. 8 & 9 illustrate operations of methods and receivers according to embodiments of the present invention.

As shown in FIG. 8, operations of methods and receivers according to embodiments of the present invention include receiving first and second symbol-spaced baseband signals at antenna 45 (block 151). As discussed above, the first symbol-spaced baseband signal can correspond to first portions of first and second encoded data sequences transmitted over first and second baseband channels, and the second symbol-spaced baseband signal can correspond to second portions of the first and second encoded data sequences transmitted over the first and second baseband channels. The first and second symbol-spaced baseband signals are combined at 2-input matched filter 51 (block 153) to provide a combined baseband channel, and the combined baseband channel is prefiltered at prefilter 53 (block 155) to provide minimum phase channel characteristics. The prefiltered combined baseband channel is equalized at equalizer 57 (block 157) to provide an estimate of the data sequence.

Figure 9:
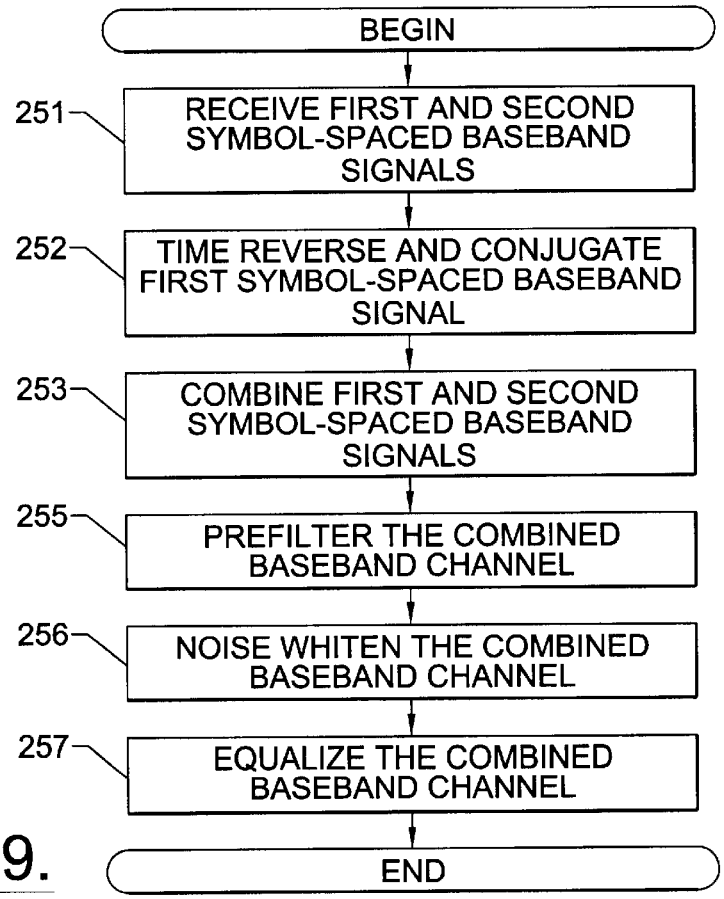

Operations of methods and receivers according to additional embodiments of the present invention are illustrated in FIG. 9. As shown in FIG. 9, first and second symbol-spaced baseband signals can be received at antenna 45 (block 251). As discussed above, the first symbol-spaced baseband signal can correspond to first portions of first and second encoded data sequences transmitted over first and second baseband channels, and the second symbol-spaced baseband signal can correspond to second portions of the first and second encoded data sequences transmitted over the first and second baseband channels. The first symbol-spaced baseband signal can be time reversed and complex conjugated at blocks 47 and 49 (block 252) before being input to the 2-input matched filter 51, while the second symbol-spaced baseband signal can be applied to the 2-input matched filter 51 without time reversal or complex conjugation.

The first and second symbol-spaced baseband signals can then be combined at 2-input matched filter 51 (block 253) to provide a combined baseband channel, and the combined baseband channel can be prefiltered at prefilter 53 (block 255) to provide minimum phase channel characteristics. The combined baseband channel can also be noise whitened at noise whitening filter 55 (block 256) before performing equalization at equalizer 57. The prefiltered and noise whitened combined baseband channel can then be equalized at equalizer 57 (block 257) to provide an estimate of the data sequence.

The present invention has been described above primarily with respect to DFSE equalizers. The present invention, however, is not so limited and may be applied to other types of reduced complexity equalizers such as, for example, RSSE equalizers.

In the drawings and specification, there have been disclosed typical preferred embodiments of the invention and, although specific terms are employed, they are used in a generic and descriptive sense only and not for the purposes of limitation, the scope of the invention being set forth in the following claims.

That which is claimed is:

1. A method for receiving transmissions from a diversity transmitter, the method comprising:
   receiving a first symbol-spaced baseband signal corresponding to first portions of first and second encoded data sequences transmitted over respective first and second baseband channels;
   receiving a second symbol-spaced baseband signal corresponding to second portions of the first and second encoded data sequences transmitted over the first and second baseband channels;
   combining the first and second symbol-spaced baseband signals to provide a combined baseband signal;
   prefiltering the combined baseband signal to provide minimum phase channel characteristics; and
   equalizing the prefiltered combined baseband signal to provide an estimate of a data sequence.

2. A method according to claim 1 wherein prefiltering the combined baseband signal to provide minimum phase characteristics comprises prefiltering the combined baseband signal to provide minimum phase channel characteristics and to provide a noise component having approximately the same color as the combined baseband signal.

3. A method according to claim 1 wherein equalizing the prefiltered combined baseband signal is preceded by:
   whitening a noise component of the combined baseband signal so that equalizing the prefiltered combined baseband signal provides equalizing the prefiltered and noise whitened combined baseband signal to provide the estimate of the data sequence.

4. A method according to claim 3 wherein prefiltering the combined baseband signal is followed by whitening the noise component of the combined baseband signal so that whitening the noise component of the combined baseband signal comprises whitening the noise component of the prefiltered combined baseband signal.

5. A method according to claim 1 wherein equalizing the prefiltered combined baseband signal to provide the estimate of the data sequence comprises equalizing the prefiltered combined baseband signal to provide the estimate of the data sequence according to a reduced complexity algorithm.

6. A method according to claim 1 wherein equalizing the prefiltered combined baseband signal to provide the estimate of the data sequence comprises equalizing the prefiltered combined baseband signal to provide the estimate of the data sequence according to one of decision feedback sequence estimation (DFSE) or reduced state sequence estimation (RSSE).

7. A method according to claim 1 wherein combining the first and second symbol-spaced baseband signals to provide the common baseband signal is preceded by:
   time reversing the first symbol-spaced baseband signal; and
   conjugating the first symbol-spaced baseband signal;
   wherein combining the first and second symbol-spaced baseband signals to provide the common baseband signal comprises combining the time reversed and conjugated first symbol-spaced baseband signal with the second symbol-spaced baseband signal.

8. A method according to claim 1 wherein prefiltering the combined baseband signal to provide minimum phase channel characteristics comprises prefiltering the combined baseband signal according to a prefilter function wherein the prefilter function is computed using spectral factorization of a composite of estimates of the first and second baseband channels.

9. A method according to claim 8 wherein prefiltering the combined baseband signal to provide minimum phase channel characteristics comprises prefiltering the combined baseband signal according to an anti-causal linear filter function.

10. A method according to claim 3 wherein whitening the noise component of the combined baseband signal comprises whitening the noise component of the combined baseband signal according to a minimum-phase linear noise whitening function.

11. A method according to claim 1 wherein wherein a data sequence is encoded at the diversity transmitter according to a first construction for transmission from a first antenna over the first baseband channel and the data sequence is encoded according to a second construction for transmission from a second antenna over the second baseband channel.

12. A method according to claim 11 wherein the first and second encoded data sequences are transmitted over a common frequency during a common transmission burst.

13. A method according to claim 12 wherein the data sequence is divided into first and second data sequence portions, wherein the common transmission burst is divided into first and second burst portions, wherein the first portion of the first encoded data sequence includes information corresponding to the second data sequence portion transmitted during the first burst portion, wherein the second portion of the first encoded data sequence includes information corresponding to the first data sequence portion transmitted during the second burst portion, wherein the first portion of the second encoded data sequence includes information corresponding to the first data sequence portion transmitted during the first burst portion, and wherein the second portion of the second encoded data sequence includes information corresponding to second data sequence portion transmitted during the second burst portion.

14. A receiver for receiving transmissions from a diversity transmitter, the receiver comprising:
   an antenna that receives a first symbol-spaced baseband signal corresponding to first portions of first and second encoded data sequences transmitted over first and second baseband channels, and that receives a second symbol-spaced baseband signal corresponding to second portions of the first and second encoded data sequences transmitted over the first and second baseband channels;
   a 2-input filter that combines the first and second symbol-spaced baseband signals to provide a combined baseband signal;
   a prefilter that prefilters the combined baseband signal to provide minimum phase channel characteristics; and
   an equalizer that equalizes the prefiltered combined baseband signal to provide an estimate of the data sequence.

15. A receiver according to claim 14 wherein the prefilter further provides a noise component having approximately the same color as the combined baseband signal.

16. A receiver according to claim 14 further comprising:
   a noise whitening filter coupled in series with the prefilter between the 2-input filter and the equalizer wherein the noise whitening filter whitens a noise component of the combined baseband signal so that the equalizer equalizes the prefiltered and whitened combined baseband channel to provide the estimate of the data sequence.

17. A receiver according to claim 16 wherein the noise whitening filter is coupled between the prefilter and the equalizer.

18. A receiver according to claim 14 wherein the equalizer comprises a reduced complexity equalizer.

19. A receiver according to claim 14 wherein the equalizer comprises one of a decision feedback sequence estimation (DFSE) equalizer or reduced state sequence estimation (RSSE) equalizer.

20. A receiver according to claim 14 further comprising:
a time reversal circuit coupled between the antenna and a first input of the 2-input filter; and
a conjugation circuit coupled in series with the time reversal circuit between the antenna and the first input of the 2-input filter so that the first symbol-spaced baseband signal is time reversed and conjugated and wherein the 2-input filter combines the time reversed and conjugated first symbol-spaced baseband signal with the second symbol-spaced baseband signal.

21. A receiver according to claim 14 wherein the prefilter comprises a prefilter function computed using spectral factorization of a composite of estimates of the first and second baseband channels.

22. A receiver according to claim 21 wherein the prefilter comprises an anti-causal linear filter function to provide minimum phase channel characteristics.

23. A receiver according to claim 16 wherein the noise whitening filter comprises a minimum-phase linear noise whitening function.

24. A receiver according to claim 14 wherein a data sequence is encoded at the diversity transmitter according to a first construction for transmission from a first antenna over the first baseband channel and the data sequence is encoded according to a second construction for transmission from a second antenna over the second baseband channel.

25. A receiver according to claim 24 wherein the first and second encoded data sequences are transmitted over a common frequency during a common transmission burst.

26. A receiver according to claim 25 wherein the data sequence is divided into first and second data sequence portions, wherein the common transmission burst is divided into first and second burst portions, wherein the first portion of the first encoded data sequence includes information corresponding to the second data sequence portion transmitted during the first burst portion, wherein the second portion of the first encoded data sequence includes information corresponding to the first data sequence portion transmitted during the second burst portion, wherein the first portion of the second encoded data sequence includes information corresponding to the first data sequence portion transmitted during the first burst portion, and wherein the second portion of the second encoded data sequence includes information corresponding to second data sequence portion transmitted during the second burst portion.

27. A receiver for receiving transmissions from a diversity transmitter, the receiver comprising:
means for receiving a first symbol-spaced baseband signal corresponding to first portions of first and second encoded data sequences transmitted over first and second baseband channels;
means for receiving a second symbol-spaced baseband signal corresponding to second portions of the first and second encoded data sequences transmitted over the first and second baseband channels;
means for combining the first and second symbol-spaced baseband signals to provide a combined baseband signal;
means for prefiltering the combined baseband signal to provide minimum phase channel characteristics; and
means for equalizing the prefiltered combined baseband signal to provide an estimate of the data sequence.

28. A receiver according to claim 27 wherein the means for prefiltering the combined baseband signal further provides a noise component having approximately the same color as the combined baseband signal.

29. A receiver according to claim 27 further comprising:
means for whitening a noise component of the combined baseband signal coupled in series with the means for prefiltering between the means for combining and the means for equalizing.

30. A receiver according to claim 29 wherein the means for whitening is coupled between the means for prefiltering and the means for equalizing.

31. A receiver according to claim 27 wherein the means for equalizing comprises a reduced complexity means for equalizing.

32. A receiver according to claim 27 wherein the means for equalizing comprises one of a decision feedback sequence estimation (DFSE) equalizer or reduced state sequence estimation (RSSE) equalizer.

33. A receiver according to claim 27 further comprising:
means for time reversing the first symbol-spaced baseband signal; and
means for conjugating the first symbol-spaced baseband signal coupled so that the means for combining combines the time reversed and conjugated first symbol-spaced baseband signal with the second symbol-spaced baseband signal.

34. A receiver according to claim 27 wherein the means for prefiltering comprises a prefilter function computed using spectral factorization of a composite of estimates of the first and second baseband channels.

35. A receiver according to claim 34 wherein the means for prefiltering comprises an anti-causal linear filter function to provide minimum phase channel characteristics.

36. A receiver according to claim 29 wherein the means for whitening comprises a minimum-phase linear noise whitening function.

37. A receiver according to claim 27 wherein a data sequence is encoded according to a first construction for transmission from a first antenna over the first baseband channel and the data sequence is encoded according to a second construction for transmission from a second antenna over the second baseband channel.

38. A receiver according to claim 37 wherein the first and second encoded data sequences are transmitted over a common frequency during a common transmission burst.

39. A receiver according to claim 38 wherein the data sequence is divided into first and second data sequence portions, wherein the common transmission burst is divided into first and second burst portions, wherein the first portion of the first encoded data sequence includes information corresponding to the second data sequence portion transmitted during the first burst portion, wherein the second portion of the first encoded data sequence includes information corresponding to the first data sequence portion transmitted during the second burst portion, wherein the first portion of the second encoded data sequence includes information corresponding to the first data sequence portion transmitted during the first burst portion, and wherein the second portion of the second encoded data sequence includes information corresponding to second data sequence portion transmitted during the second burst portion.

* * * * *

UNITED STATES PATENT AND TRADEMARK OFFICE
CERTIFICATE OF CORRECTION

ItPATENT NO. : 6,778,619 B2
DATED : August 17, 2004
INVENTOR(S) : Zangi et al.

It is certified that error appears in the above-identified patent and that said Letters Patent is hereby corrected as shown below:

<u>Title page,</u>
Item [56], References Cited, U.S. PATENT DOCUMENTS, should read:
-- 5,727,032    3/1998   Jamal et al. …………..375/347 --

Signed and Sealed this

Twenty-eighth Day of December, 2004

JON W. DUDAS
*Director of the United States Patent and Trademark Office*